United States Patent [19]

Takuma et al.

[11] Patent Number: 5,158,703

[45] Date of Patent: Oct. 27, 1992

[54] RESIN COMPOSITION FOR ULTRAVIOLET LUMINESCENT SCREEN

[75] Inventors: Keisuke Takuma; Kimitoshi Kato; Shizuo Kuroda, all of Ohmuta; Fumio Matsui, Sayama, all of Japan

[73] Assignees: Mitsui Toatsu Chemicals Inc.; Pioneer Electronic Corporation, both of Tokyo, Japan

[21] Appl. No.: 766,245

[22] Filed: Sep. 27, 1991

[30] Foreign Application Priority Data

Apr. 3, 1991 [JP] Japan .................................. 3-70848
Apr. 3, 1991 [JP] Japan .................................. 3-70850

[51] Int. Cl.$^5$ .............................................. C09K 11/02
[52] U.S. Cl. .......................... 252/301.35; 252/301.19; 252/582; 252/586; 252/588; 252/589
[58] Field of Search ..................... 252/301.19, 301.35, 252/582, 586, 588, 589

[56] References Cited

U.S. PATENT DOCUMENTS 4,891,075  1/1990  Dakubu .............................. 252/589

FOREIGN PATENT DOCUMENTS 195413  9/1986  European Pat. Off. .

Primary Examiner—Veronica P. Hoke
Attorney, Agent, or Firm—Millen, White & Zelano

[57] ABSTRACT

Disclosed is a resin composition for ultraviolet luminescent screen comprising one or more of luminescent compound represented by the formula (I):

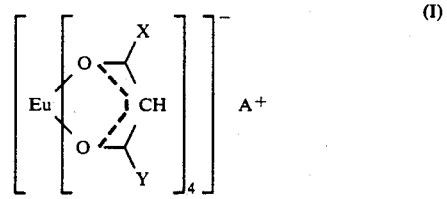

wherein X is

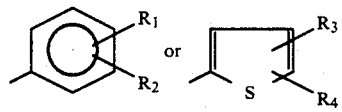

wherein $R_1$, $R_2$, $R_3$ and $R_4$ are individually a hydrogen atom, halogen atom, alkyl, alkoxy, amino, alkylamino, dialkylamino, anyl or aralkyl, and Y is perfluoroalkyl, and $A^+$ is a cation represented by the formula (II):

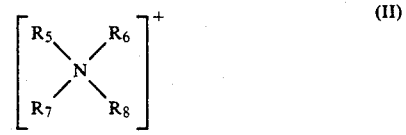

wherein $R_5$, $R_6$, $R_7$ and $R_8$ are individually a hydrogen atom, alkyl or aralkyl and may be combined with each other to form a ring, or a pyridium cation which may have a substituent, or a phosphonium cation.

11 Claims, No Drawings

RESIN COMPOSITION FOR ULTRAVIOLET LUMINESCENT SCREEN

BACKGROUND OF THE INVENTION

1. Field of the Invention

The present invention provides a resin composition which is colorless under ambient visible light, develops a red color under irradiation of ultraviolet light, and is used for an ultraviolet luminescent screen.

2. Prior Art of the Invention

Luminescent screens prepared by use of luminescent inorganic compounds have been proposed in many patents, for example, Japanese Laid-Open Patents SHO 49-89688(1974), 49-122490(1974), 53-33986(1978), 55-149375(1980), 56-8485(1981) and 57-23676(1982).

Fluorescent materials used for these screens are inorganic ions or oxides and must be used in a turbid state because they have no transparency in the resin used in the luminescent screen. Consequently bright display cannot be obtained unless ultraviolet light for excitation irradiates the front face of the screen. However, front face irradiation has a high degree of risk of injuring eyes by reflected light. As a result, it has been strongly desired to develop a transparent resin screen which can be irradiated from the back.

SUMMARY OF THE INVENTION

The object of the present invention is to provide a fluorescent material which has no sensitivity at all to visible light, develops a red luminescent color by ultraviolet light, and has high solubility in the resin.

As a result of an intensive investigation in order to accomplish the above object, the present inventors have found that a tetra(benzoyltrifluoroacetonato)europium base complex ion compound and a tetra(thenoyltrifluoroacetonato)europium base complex ion compound have the desired properties.

A product aspect of the invention is a resin composition for ultraviolet luminescent screen comprising one or more of luminescent compound represented by the formula (I):

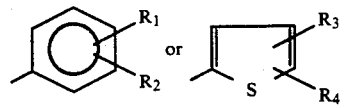
(I)

wherein X is

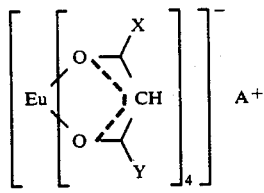

wherein $R_1$, $R_2$, $R_3$ and $R_4$ are individually a hydrogen atom, halogen atom, alkyl, alkoxy, amino, alkylamino, dialkylamino, aryl or aralkyl, and Y is perfluoroalkyl, and $A^+$ is a cation represented by the formula (II):

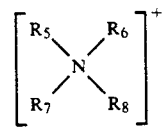
(II)

wherein $R_5$, $R_6$, $R_7$ and $R_8$ are individually a hydrogen atom, alkyl or aralkyl and may be combined with each other to form a ring, or a pyridium cation which may have a substituent, or a phosphonium cation.

The luminescent screen obtained by using the composition of the invention has a transparency which could not be obtained by a the luminescent screen prepared from inorganic luminescent compounds conventionally used.

Further, a strongly luminescent screen can be obtained from the resin composition comprising tetra (benzoyltrifluoroacetonate)europium complex or tetra (benzoyltrifluoroacetonato)europium complex. Thus the present invention is very valuable in practical use.

DETAILED DESCRIPTION OF THE INVENTION

The present invention will hereinafter be illustrated in detail.

The luminescent compound of the invention is represented by the above formula (I) and is referred to as a tetra (benzoyltrifluoroacetonato) europium complex or a tetra (thenoyltrifluoroacetonato) europium complex.

In the formula (I), X is a group represented by

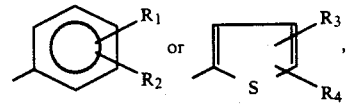

and $R_1$, $R_2$, $R_3$ and $R_4$ are, for example, a hydrogen atom; halogen atoms such as chlorine, fluorine and bromine; alkyl groups such as methyl, ethyl and isopropyl; alkoxy groups such as methoxy, ethoxy and butoxy; amino; dialkyl amino groups such as dimethylamino and diethylamino; alkylamino groups such as methylamino and ethylamino; aryl groups such as phenyl and p-tolyl; and aralkyl groups such as benzyl, phenethyl and 3-(2-methylphenyl)propyl, Y is a perfluoroalkyl group which includes trifluoromethyl, pentafluoroethyl and heptafluoropropyl.

When the cation in the formula (I) is an ammonium cation represented by the formula (II):

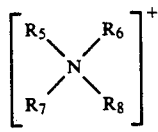
(II)

exemplary $R_3$, $R_4$, $R_5$ and $R_6$ include an hydrogen atom; alkyl groups such as methyl, ethyl, butyl and octyl; and aralkyl groups such as benzyl and phenetyl.

The ammonium cation includes, for example, tetraethylammonium, tetra-n-butylammonium, methyltri-n-octylammonium, trimethylbenzylammonium, dimethyl (β-phenyl)ethylammonium, tri-n-butyl(β-phenyl)ethylammonium, dimethyldiethylammonium, tetra-n-octylammonium, N-methylpiperidinium, N,N-dimethylpiperidinium, N-ethylpyrrolidinium and N,N-diethylpyrrolidinium.

Exemplary other cations which is represented by $A^+$ include pyrorinium cations such as N-benzylpyridinum, N-methylpyridinium and 1,4-dimethylpyridinium; and phosphonium cations such as tetraphenylphosphonium and tetrabutylphosphonium.

The compound represented by the above formula (I) can be prepared with ease by reacting europium perchlorate with a benzoyltrifluoroacetonate compound or a thenoyltrifluoroacetonate compound in acetone in the presence of sodium hydroxide and successively converting the resultant compound to a complex ion by the action of $A^+X^-$ wherein $A^+$ is the same as above and $X^-$ is an anion such as halogen ion.

Tetra (benzoyltrifluoroacetonato) europium complex compounds which can be used for the screen of the invention are illustrated in Tables 1 and 2. Table 1 illustrates the compounds having ammonium base pairing ions. Table 2 illustrates the compounds having pyridinium base and phosphonium base pairing ions.

Tetra (thenoyltrifluoroacetonato)europium complex compounds which can be used for the screen of the invention are illustrated in Tables 3 and 4. Table 3 illustrates the compounds having ammonium base pairing ions. Table 4 illustrates the compounds having pyridinium base and phosphonium base pairing ions.

The resins which can be used for the resin composition of the invention are optically transparent and include, for example, polyvinyl alcohol, polyvinyl butyral, diethylene glycol bisallylcarbonate resin, polymethylmethacrylate and its copolymer, polyvinyl acetate, cellulosics, polyester, polycarbonate, polystyrene and its copolymer, epoxy resin, di(meth)acrylate resin of bisphenol A or halogenated bisphenol A and its copolymer, nylon resin and polyurethane.

In the resin composition of the invention, the content of the above luminescent compound in the resin is not limited so long as the transparency of the resin is retained. The amount is usually from 0.001 to 10% by weight, preferably from 0.01 to 5% by weight for the resin.

The process for preparing the screen by blending the luminescent compound of the formula (I) in the resin includes dissolving said luminescent compound in a monomer of the resin and thereafter conducting polymerization of the resin; kneading said compound with the resin and conducting injection molding of the resultant composition; and dissolving said compound in a solvent together with the resin and evaporating the solvent.

Screens were prepared from the resin compositions individually containing the compounds illustrated in Tables 1 to 4. These screens developed a clear red color by irradiation with ultraviolet light. After 300 hours of weatherability test in a sunshine weatherometer, reduction of luminescent intensity was only 2% and excellent stability was proved.

TABLE 1

| Compound No. | Formula (I) | | | Formula (II) | | | | D.T.*[1] (°C.) | L.C.*[2] |
|---|---|---|---|---|---|---|---|---|---|
| | $R_1$ | $R_2$ | Y | $R_5$ | $R_6$ | $R_7$ | $R_8$ | | |
| (1) | H | H | $CF_3$ | $n\text{-}C_4H_9$ | $n\text{-}C_4H_9$ | $n\text{-}C_4H_9$ | $n\text{-}C_4H_9$ | 245 | red |
| (2) | H | H | $CF_3$ | $-CH_3$ | $n\text{-}C_8H_{17}$ | $n\text{-}C_8H_{17}$ | $n\text{-}C_8H_{17}$ | 246 | " |
| (3) | p-$OCH_3$ | H | $CF_3$ | $-CH_2-\text{C}_6\text{H}_5$ | $-CH_3$ | $-CH_3$ | $-CH_3$ | 244 | " |
| (4) | m-$CH_3$ | m-$CH_3$ | $CF_3$ | $-(CH_2)_2-\text{C}_6\text{H}_5$ | $-H$ | $-C_2H_5$ | $-C_2H_5$ | 245 | " |
| (5) | p-$N(CH_3)_2$ | H | $CF_3$ | $-(CH_2)_2-\text{C}_6\text{H}_4-CH_3$ | $n\text{-}C_4H_9$ | $n\text{-}C_4H_9$ | $n\text{-}C_4H_9$ | 242 | " |
| (6) | p-Cl | H | $CF_3$ | $-CH_3$ | $-CH_3$ | $n\text{-}C_{12}H_{25}$ | $n\text{-}C_{12}H_{25}$ | 248 | " |
| (7) | p-$\text{C}_6\text{H}_5$ | H | $CF_3$ | $-C_2H_5$ | $-C_2H_5$ | $-(CH_2)_4-$ | | 249 | " |
| (8) | p-$\text{C}_6\text{H}_5$ | H | $C_2F_5$ | $-C_2H_5$ | $-C_2H_5$ | $-(CH_2)_4-$ | | 247 | " |
| (9) | p-$CH_2$-$\text{C}_6\text{H}_5$ | H | $CF_3$ | $-C_2H_5$ | $-C_2H_5$ | $-(CH_2)_5-$ | | 246 | " |

TABLE 1-continued

| Compound No. | Formula (I) R$_1$ | R$_2$ | Y | R$_5$ | Formula (II) R$_6$ | R$_7$ | R$_8$ | D.T.*[1] (°C.) | L.C.*[2] |
|---|---|---|---|---|---|---|---|---|---|
| (10) | p-CH$_2$-⌬ | H | C$_2$F$_5$ | —C$_2$H$_5$ | —C$_2$H$_5$ | —(CH$_2$)$_5$— | | 244 | " |
| (11) | p-CH$_2$-⌬-CH$_3$ | H | CF$_3$ | n-C$_8$H$_{17}$ | n-C$_8$H$_{17}$ | n-C$_8$H$_{17}$ | n-C$_8$H$_{17}$ | 240 | " |
| (12) | p-CH$_2$-⌬-CH$_3$ | H | C$_3$F$_7$ | n-C$_8$H$_{17}$ | n-C$_8$H$_{17}$ | n-C$_8$H$_{17}$ | n-C$_8$H$_{17}$ | 243 | " |
| (13) | p-NHC$_2$H$_5$ | H | CF$_3$ | n-C$_8$H$_{17}$ | n-C$_8$H$_{17}$ | n-C$_8$H$_{17}$ | n-C$_8$H$_{17}$ | 239 | " |
| (14) | p-NHC$_2$H$_5$ | H | C$_3$F$_7$ | n-C$_8$H$_{17}$ | n-C$_8$H$_{17}$ | n-C$_8$H$_{17}$ | n-C$_8$H$_{17}$ | 240 | " |

Note:
*[1]D.T.: Decomposition Temperature (°C.)
*[2]L.C.: Luminescent Color

TABLE 2

| Compound No. | Formula (I) R$_1$ | R$_2$ | Y | A$^+$ | D.T.*[1] (°C.) | L.C.*[2] |
|---|---|---|---|---|---|---|
| (15) | H | H | CF$_3$ | ⌬-N(+)−CH$_2$−⌬ | 243 | red |
| (16) | H | H | CF$_3$ | ⌬-N(+)−C$_4$H$_9$(n) | 242 | " |
| (17) | P—OCH$_3$ | H | CF$_3$ | CH$_3$-⌬-N(+)−CH$_3$ | 242 | " |
| (18) | m-CH$_3$ | m-CH$_3$ | CF$_3$ | ⌬-N(+)−CH$_2$−⌬ | 245 | " |
| (19) | P—Cl | H | CF$_3$ | H$_3$C-⌬(with H$_3$C)-N(+)−CH$_3$ | 243 | " |
| (20) | H | H | CF$_3$ | P$^+$(⌬)$_4$ | 235 | " |
| (21) | H | H | CF$_3$ | P$^+$(C$_4$H$_9$)$_4$ | 237 | " |
| (22) | P—OCH$_3$ | H | CF$_3$ | P$^+$(CH$_2$−⌬)$_4$ | 237 | " |

TABLE 2-continued
| Compound | Formula (I) | | | | D.T.[1] | L.C.[2] |
|---|---|---|---|---|---|---|
| No. | $R_1$ | $R_2$ | Y | $A^+$ | (°C.) | |
| (23) | P—OCH$_3$ | H | $C_2F_5$ | 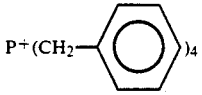 | 240 | " |
Note:
[1]D.T.: Decomposition Temperature (°C.)
[2]L.C.: Luminescent Color

TABLE 3

| Compound No. | Formula (I) R3 | R4 | Y | Formula (II) R5 | R6 | R7 | R8 | L.C.*1 | Screen preparation process Resin | Process*2 |
|---|---|---|---|---|---|---|---|---|---|---|
| (24) | H | H | CF3 | —CH3 | n-C8H17 | n-C8H17 | n-C8H17 | red | polyvinyl alcohol, | (c) |
| (25) | 4-OCH3 | H | CF3 | —CH2 | —CH3 | —CH3 | —CH3 | " | polyvinyl alcohol, | " |
| (26) | 3-CH3 | 4-CH3 | CF3 | —(CH2)2 | —H | —C2H5 | —C2H5 | " | polyvinyl alcohol, | " |
| (27) | 4-N(CH3)2 | H | CF3 | —(CH2)2 | n-C4H9 | n-C4H9 | n-C4H9 | " | polyvinyl butyral, | (c) |
| (28) | | H | CF3 | —C2H5 | —C2H5 | —(CH2)4— | | " | polyvinyl butyral, | " |
| (29) |  | H | C2F5 | —C2H5 | —C2H5 | —(CH2)5— | | " | polymethylmethacrylate, | (a) |
| (30) |  | H | C2F5 | n-C8H17 | n-C8H17 | n-C8H17 | n-C8H17 | " | polymethylmethacrylate, | " |
| (31) | 4-NHC2H5 | H | C2F5 | n-C8H17 | n-C8H17 | n-C8H17 | n-C8H17 | " | polymethylmethacrylate, | " |

Note;
*1 L.C.; Luminescent Color
*2 (a) Cast polymerization process as in Example 1
(b) Melt injection molding process as in Example 2
(c) Cast evaporation process as in Example 3

TABLE 4

| Compound No. | Formula (I) | | | |
|---|---|---|---|---|
| | R₃ | R₄ | Y | A⁺ |
| (32) | H | H | CF₃ | 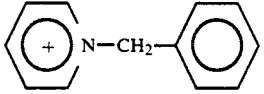 |
| (33) | H | H | CF₃ | 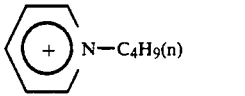 |
| (34) | 4-OCH₃ | H | CF₃ | 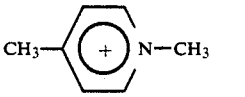 |
| (35) | 3-CH₃ | 4-CH₃ | CF₃ | 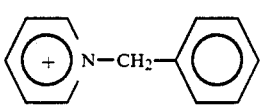 |
| (36) | 4-Cl | H | CF₃ | 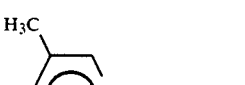 |
| (37) | H | H | C₂F₅ |  |
| (38) | 4-OCH₃ | H | C₂F₅ |  |

| Compound No. | L.C*¹ | Screen preparation process | |
|---|---|---|---|
| | | Resin | Process*² |
| (32) | red | polyvinyl acetate | (a) |
| (33) | " | polyvinyl acetate | " |
| (34) | " | polyethylene tetraphthalate | (b) |
| (35) | " | polycarbonate | " |
| (36) | " | polystyrene | " |
| (37) | " | polystyrene | (b) |
| (38) | " | " | " |

Note:
*¹L.C.: Luminescent Color
*²(a) Cast polymerization process as in Example 1
(b) Melt injection molding process as in Example 2
(c) Cast evaporation process as in Example 3

The resin composition for the ultraviolet luminescent screen of the invention will hereinafter be illustrated further in detail by way of examples.

In the examples, part means part by weight.

EXAMPLE 1

A solution was obtained by dissolving 3 parts of tetrabutylammonium tetra(benzoyltrifluoroacetonato)europium complex [compound (1)] in 100 parts of methyl methacrylate and subjected to cast polymerization in the presence of azobisisobutyronitrile as a polymerization initiator to prepare a resin plate.

The resin screen thus obtained was transparent and colorless under a common fluorescent lamp and outdoors, and developed clearly a red luminescent color under irradiation with ultraviolet light.

The luminescent spectrum and excitation spectrum of the resin screen were measured with a fluorophotometer FP-770 (Trade mark of Nippon Bunko Co.). Maximum luminescent wave length was 619 nm, and maximum excitation wave length was 349 nm. The screen was allowed to stand outdoors for a month. After exposure, the screen maintained almost the same luminescent intensity as in the initial state and no deterioration was found of the resin.

EXAMPLE 2

A blend composed of 0.2 part of n-tetrabutylammonium tetra (benzoylfluoroacetonato)europium complex [compound (1)] and 100 parts of polystyrene was melt-kneaded at 200° C. and injection molded to prepare a resin screen. The resin screen developed clearly a red luminescent color under irradiation of ultraviolet light. Weatherability test was carried out for 300 hours in a sunshine weatherometer. After the test, reduction of luminescent intensity was only 2%. Thus weathering stability was excellent.

EXAMPLE 3

A solution obtained by dissolving 0.01 part of dimethyldodecylammonium tetra [(p-chlorobenzoyl)trifluoroacetonato] europium complex [compound (6)] and 1 part of polyvinyl butyral resin in 10 parts of tetrahydrofuran was cast on a smooth glass surface. Tetrahydrofuran solvent was gradually evaporated under atmospheric pressure to obtain a cast screen. The resin screen thus obtained developed a red luminescent color having high intensity and exhibited excellent stability after the same exposure as conducted in Example 1.

EXAMPLE 4

A solution was obtained by dissolving 0.03 part of tetrabutylphosphonium tetra(benzoyltrifluoroacetonato) europium complex [compound (17)] and 3 parts of polyvinyl butyral in a solvent mixture composed of 20 parts of toluene and 10 parts of methyl ethyl ketone.

The solution was cast on a smooth glass plate and solvent was gradually evaporated under atmospheric pressure to prepare a cast screen.

The resin screen thus obtained was transparent and colorless under a common fluorescent lamp and outdoors, and developed clearly a red luminescent color under irradiation with ultraviolet light.

The luminescent spectrum and excitation spectrum of the resin screen were measured with a fluorophotometer FP-770 (Trade mark of Nippon Bunko Co.). Maximum luminescent wave length was 618 nm, and maximum exitation wave length was 361 nm. The screen was allowed to stand outdoors for a month. After exposure, the screen maintained almost the same luminescent intensity as in the initial state and no deterioration was found of the resin.

EXAMPLE 5

A solution was obtained by dissolving 0.3 part of tetrabutylammonium tetra (thenoyltrifluoroacetonato)europium complex in 1000 parts of methyl methacrylate and subjected to cast polymerization in the presence of azoisobutyronitrile as a polymerization initiator to prepare a resin plate.

The resin screen thus obtained was transparent and colorless under a common fluorescent lamp and outdoors, and developed clearly a red luminescent color under irradiation with ultraviolet light.

The luminescent spectrum and excitation spectrum of the resin screen were measured with a fluorophotometer FP-770 (Trade mark of Nippon Bunko Co.). Maximum luminescent wave length was 620 nm, and maximum excitation wave length was 350 nm. The screen was allowed to stand outdoors for a month. After exposure, the screen maintained almost the same luminescent intensity as in the initial state and no deterioration was found of the resin.

EXAMPLE 6

A blend composed of 0.2 part of n-tetrabutylammonium tetra (thenoylfluoroacetonato)europium complex and 1000 parts of polystyrene was melt-kneaded at 200° C. and injection molded to prepare a resin screen. The resin screen developed clearly a red luminescent color under irradiation of ultraviolet light. Weatherability test was carried out for 300 hours in a sunshine weatherometer. After the test, reduction of luminescent intensity was only 2%. Thus weathering stability was excellent.

EXAMPLE 7

A solution was obtained by dissolving 0.1 part of dimethyldodecylammonium tetra [(4-chloro)thenoyltrifluoroacetonato] europium complex and 10 parts of polyvinyl butyral resin in 100 parts of tetrahydrofuran.

The solution was cast on a smooth glass surface and the solvent was gradually evaporated under atmospheric pressure to prepare a cast screen.

The resin screen developed a red color having high luminescent intensity and exhibited excellent stability after the same exposure as conducted in Example 5.

EXAMPLE 8

A solution was prepared by dissolving 0.3 parts of tetrabutylphosphonium tetra(thenoyltrifluoroacetonato)europium complex and 30 parts of polyvinyl butyral resin in a solvent mixture composed of 200 parts of toluene and 100 parts of methyl ethyl ketone.

The solution thus obtained was cast on a smooth glass surface and the solvents were gradually evaporated under atmospheric pressure to prepare a cast screen.

The resin screen thus obtained was transparent and colorless under a common fluorescent lamp and outdoors, and developed clearly a red luminescent color under irradiation of ultraviolet light.

The luminescent spectrum and excitation spectrum of the resin screen were measured with a fluorophotometer FP-770 (Trade mark of Nippon Bunko Co.). Maximum luminescent wave length was 620 nm and maximum excitation wave length was 365 nm. The screen was allowed to stand outdoors for a month. After exposure, the screen maintained almost the same luminescent intensity as in the initial state and no deterioration was found of the resin.

What is claimed is:

1. A resin composition adapted for use as an optically transparent ultraviolet luminescent screen comprising a resin and an amount effective to impart luminescence to the resin composition when excited by the ultraviolet radiation of one or more luminescent compounds represented by formula (I):

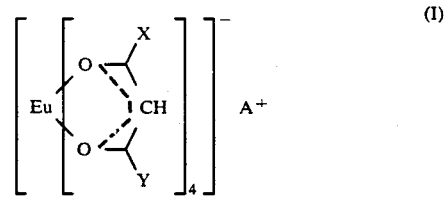

wherein X is

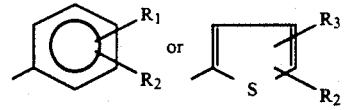

wherein $R_1$, $R_2$, $R_3$ and $R_4$ are individually a hydrogen atom, halogen atom, alkyl, alkoxy, amino, alkylamino, dialkylamino, aryl or aralkyl, and Y is perfluoroalkyl, and $A^+$ is a cation represented by the formula (II):

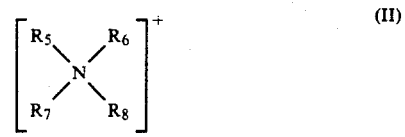

wherein $R_5$, $R_6$, $R_7$ and $R_8$ are individually a hydrogen atom, alkyl or aralkyl or combined with each other to form a ring, or a pyridium cation which may have a substituent, or a phosphonium cation.

2. The resin composition of claim 1, wherein the content of the compound of formula (I) therein is from 0.001 to 10% by weight of the resin.

3. The resin composition of claim 1, wherein the content of the compound of formula (I) therein is from 0.01–5% by weight of the resin.

4. The resin composition of claim 1, wherein the resin is a member selected from the group consisting of polyvinyl butyral, polymethacrylate, polyvinyl acetate, polyester, polycarbonate and polystyrene.

5. The resin composition of claim 1, wherein in the compound of formula (I) therein, wherein $R_5$, $R_6$, $R_7$ and $R_8$ are individually a hydrogen atom, alkyl or aralkyl or are combined with each other to form a ring.

6. The resin composition of claim 5, wherein the content of the compound of formula (I) therein is from 0.01–5% by weight of the resin.

7. The resin composition of claim 5, wherein the resin is a member selected from the group consisting of polyvinyl butyral, polymethacrylate, polyvinyl acetate, polyester, polycarbonate and polystyrene.

8. An optically transparent ultraviolet luminescent screen cast from a resin composition of claim 1.

9. An optically transparent ultraviolet luminescent screen cast from a resin composition of claim 5.

10. An optically transparent ultraviolet luminescent screen cast from a resin composition of claim 6.

11. An optically transparent ultraviolet luminescent screen cast from a resin composition of claim 7.

* * * * *

UNITED STATES PATENT AND TRADEMARK OFFICE
CERTIFICATE OF CORRECTION

PATENT NO. : 5,158,703

DATED : October 27, 1992

INVENTOR(S) : Keisuke TAKUMA et al.

It is certified that error appears in the above-identified patent and that said Letters Patent is hereby corrected as shown below:

On the title page, item [57]:

IN THE ABSTRACT: delete "pyridium" insert --pyridinium--

Col. 2, Line 11; delete "pyridium cations" insert --pyridinium cations--

Col. 2, Line 19; delete " benzoyltrifluoroacetonate" insert --benzoyltrifluoroacetonato--

Col. 2, Line 20; delete "benzoyltrifluoroacetonato" insert --thenoyltrifluoroacetonato--

Col. 3, Line 4; delete "pyrorinium" insert --pyridinium--

Col. 3, Line 4; delete "N-benzylpryridium" insert --N-benzylpyridinium--

Col. 12, Lines 6-7; delete "fluorophotometer" insert --fluorephotometer--

Col.12, Line 17; delete "benzoylfluoroacetonato" insert --benzoyltrifluoroacetonato--

Col. 12, Line 56-57 ; delete "fluorophotometer" insert --fluorephotometer--

Col. 13, Lines 8-9; delete "fluorophotometer" insert --fluorephotometer--

Col. 13, Line 19; delete "thenoylfluoroacetonato" insert --thenoyltrifluoroacetonato--

Col. 13, Lines 56-57; delete "fluorophotometer" insert --fluorephotometer--

Col. 14, Line 36; delete "pyridium cation" insert --pyridinium cation--

Signed and Sealed this

Thirtieth Day of November, 1993

Attest:

BRUCE LEHMAN

*Attesting Officer*  *Commissioner of Patents and Trademarks*